Patented Dec. 31, 1940

2,226,799

UNITED STATES PATENT OFFICE 2,226,799

THIAZOLES

David J. Beaver, Nitro, W. Va., assignor to Monsanto Chemical Company, St. Louis, Mo., a corporation of Delaware No Drawing. Application January 28, 1938,
Serial No. 187,561

3 Claims. (Cl. 260—306)

The present invention relates to a new class of rubber vulcanization accelerators, to a process of vulcanizing rubber and to the vulcanized rubber products obtained with the aid of said new vulcanization accelerators.

In accordance with the present invention it has been discovered that the products formed by condensing mercaptans with hexamethylenetetramine under certain conditions, producing thereby compounds of definite chemical structure, are rubber vulcanization accelerators. It is known to condense mercaptans with hexamethylenetetramine and to employ the indefinite mixture so obtained in rubber. The preparation of such materials is described by Winfield Scott in United States Patent 1,779,715, which preparation consists in heating hexamethylenetetramine, either dry or in aqueous solution, with a mercaptan. For example the preparation of a condensation product of mercapto-benzo-thiazole with hexamethylenetetramine at temperatures ranging from 140 to 225° C. is described. The product obtained by the method of Winfield Scott is a dark resinous material, often semi-liquid, which possesses an objectionable odor and contains a number of different chemical compounds. Said product can not be conveniently be handled but must be combined with various fillers to obtain a product having satisfactory physical properties, and can not be used at all in rubber compositions for the manufacture of articles in which an odor is objectionable. It has now been found that by carrying out the reaction in suitable organic solvents substantially a single product is formed. Thus, by condensing mercapto-benzo-thiazole and hexamethylenetetramine in the manner hereinafter described a sharp melting, light colored, readily crystalline material is obtained which may conveniently be incorporated directly into rubber and which possesses no offensive odor and is therefore suitable for use in rubber compositions utilized in the manufacture of ice trays for household refrigerators and similar articles in which an absence of odor is imperative. In addition to the desirable physical properties, as exemplified above, possessed by the preferred condensates, the accelerating properties are also an improvement over those of the indefinite mixtures heretofore employed. As an example showing the advantages of the preferred accelerators, the above mercapto-benzo-thiazole-hexamethylenetetramine condensate of this invention has been found to be a strong and fast accelerator, yet one which shows markedly less pre-vulcanization or "scorch" than the mercapto-benzo-thiazole-hexamethylenetetramine reaction product heretofore employed.

The accelerators of the present invention possess the following structural formula:

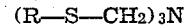

where R is an organic radical. The formation of compounds of this type from hexamethylenetetramine is typical of mercaptans and the reaction is described in the Journ. Am. Chem. Soc. 55, p. 4588 (1933). The hexamethylenetetramine condensation products described in the above article were found to be rubber vulcanization accelerators. For example, thiophenol which was shown in the above reference to give the compound

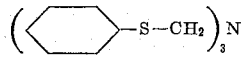

was reacted with hexamethylenetetramine in the manner described and the product so obtained incorporated in a typical rubber stock and found to exhibit accelerating properties. The reaction was extended to mercapto thiazoles and similar mercaptans and analysis indicated that the products conformed to the structure therein described.

The present invention is applicable to a wide variety of mercaptans which, condensed with hexamethylenetetramine in the manner hereinafter indicated, constitute the compounds of the present invention. Typical examples of such mercaptans are para thio cresol, thiophenol, thio β naphthol, benzyl mercaptan, butyl mercaptan, thiazole mercaptans and substitution products thereof such as 2-mercapto 4-methyl thiazole, 2-mercapto-benzo-thiazole, 2-mercapto-naphthathiazole, 2-mercapto 5-amino-benzo-thiazole, 2-mercapto 4-phenyl benzo-thiazole, 2-mercapto 4-methyl benzo-thiazole, 2-mercapto 4-ethyl benzo-thiazole, 2-mercapto 4-methoxy benzo-thiazole and 2-mercapto 4-ethoxy benzo-thiazole, 2-mercapto thiazolin

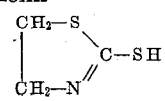

and derivatives, 2-mercapto-benzimidazole, 2-mercapto imidazole, 2-mercapto benzoxazole and mercapto compounds in general of the aliphatic and aromatic series. As is shown from the above examples of typical mercaptans, a class of compounds within the scope of the present invention are those possessing the structural formula

where X is oxygen, nitrogen or sulfur and N and X are attached to adjoining carbon atoms.

The preferred class of accelerators may be employed alone or they may be employed in conjunction with organic nitrogen containing vulcanization accelerators as activators thereof, such as for example, diphenyl guanidine, di ortho tolyl guanidine, Schiff's bases, guanidine salts, for example diphenyl guanidine phthalate, diphenyl guanidine phosphate, diphenyl guanidine acetate and analogues and equivalents thereof.

The following specific examples illustrating the preparation and use of the new and preferred class of accelerators are to be understood as descriptive of the invention and not in any sense limitative of the scope thereof.

EXAMPLE I 14 parts by weight of hexamethylenetetramine (substantially 0.1 molecular proportion) and 50.1 parts by weight of mercapto-benzo-thiazole (substantially 0.3 molecular proportion) were dissolved in a suitable inert, dry organic solvent, for example dioxane. Dioxane treated with metallic sodium and redistilled affords a satisfactory solvent but other inert solvents as for example dry benzene may be employed. The mixture was heated to 100–105° C. for twenty-four hours at which time ammonia had ceased coming off. The solvent was evaporated at room temperature and the residue was extracted with a suitable solvent, as for example ether. The ether extracts were filtered and the ether evaporated at room temperature. The desired reaction product remained as a light yellow powder and gave a melting point of 137–140° C. The reaction is believed to take place as follows:

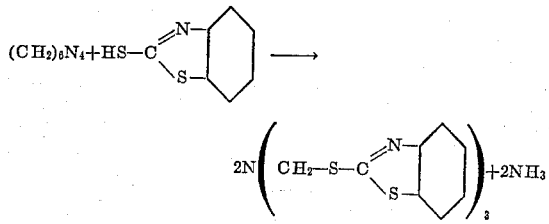

That the above described reaction produced the expected tri(benzo-thiazyl 2-thio methylene) amine was verified by analysis for sulfur and nitrogen and the material was then incorporated alone and in conjunction with an organic nitrogen containing accelerator in a typical rubber stock comprising

|  | Stock A | Stock B |
|---|---|---|
| Pale crepe | 100 | 100 |
| Zinc oxide | 8 | 8 |
| Sulfur | 2.5 | 2.5 |
| Stearic acid | 0.5 | 0.5 |
| Tri(benzo-thiazyl 2-thio methylene) amine | 0.4 | 0.4 |
| Diphenyl guanidine phthalate |  | 0.25 |

The rubber stocks so compounded were vulcanized by heating for different periods of time at the temperature of twenty pounds of steam pressure per square inch and the following modulus and tensile properties obtained upon testing the cured rubber products.

Table I

| Cure | | Modulus of elasticity in lbs./in.² at elongations of— | | Tensile at break in lbs./in.² | Ult. elong., percent |
|---|---|---|---|---|---|
| Stock | Time in mins. | 500% | 700% | | |
| B | 15 | 310 | 1120 | 2085 | 815 |
| A | 30 | 210 | 646 | 1380 | 845 |
| B | 30 | 690 | 2480 | 3240 | 745 |
| A | 45 | 300 | 950 | 1815 | 825 |
| B | 45 | 735 | 2885 | 3200 | 720 |
| A | 60 | 351 | 1175 | 2075 | 820 |
| B | 60 | 838 | 3255 | 3355 | 705 |
| A | 75 | 405 | 1440 | 2245 | 780 |
| B | 90 | 963 | 3560 | 3560 | 700 |

The above data show the marked accelerating properties of the preferred class of compounds, for example tri(benzo-thiazyl-2-thio methylene) amine and the data further show that the preferred class of accelerators are strongly activated by organic nitrogen containing accelerators, for example diphenyl guanidine phthalate. Other activators may be employed, thus it was found on testing that diphenyl guanidine and Schiff's bases strongly activated the preferred class of accelerators. Furthermore, other conditions of vulcanizing and other types of rubber stocks may be employed. For example, tri(benzo-thiazyl 2-thio methylene) amine was incorporated in a dry heat stock and vulcanized in an oven at 260° F. and found to exhibit marked accelerating properties typical of the preferred class of materials and in addition gave a good surface finish to the vulcanized stock. The incorporation of the preferred class of compounds in a "reclaim" stock followed by subsequent vulcanization in a press and testing of the cured rubber product likewise showed the marked accelerating properties of the preferred class of compounds.

EXAMPLE II

As a further specific embodiment of the invention 14 parts by weight of hexamethylene-tetramine (substantially 0.1 molecular proportion) and 73 parts by weight of 2-mercapto-4-phenyl benzothiazole (substantially 0.3 molecular proportion) were dissolved in a suitable solvent, for example substantially 600 parts by weight of dry benzene, and the mixture refluxed for 51 hours. At the end of this period the mixture was filtered from insoluble impurities and the solvent evaporated at room temperature. The residue comprising tri(4-phenyl benzo-thiazyl thio methylene) amine was incorporated in a typical rubber stock as follows:

| | |
|---|---|
| Pale crepe | 100 |
| Zinc oxide | 5 |
| Sulfur | 3 |
| Stearic acid | 0.5 |
| Tri(4-phenyl benzo-thiazyl thio methylene) amine | 0.75 |

The stock so compounded was vulcanized by heating for different periods of time at the temperature of twenty pounds of steam pressure per square inch and the following modulus and tensile properties found on testing the cured rubber product.

*Table II*

| Cure time in minutes | Modulus of elasticity in lbs./in.² at elongations of— | | Tensile at break in lbs./in.² | Ult. elong., percent |
|---|---|---|---|---|
| | 500% | 700% | | |
| 30 | 116 | 277 | 775 | 925 |
| 45 | 180 | 538 | 1,640 | 935 |
| 60 | 236 | 755 | 2,020 | 890 |
| 90 | 342 | 1,340 | 2,295 | 815 |

The above data again show the accelerating properties of the preferred class of compounds, for example tri(4-phenyl benzo-thiazyl-thio methylene) amine. In addition the above uncured stock showed little "set-up" or prevulcanization when tested with a Williams Plastometer described by Williams, Industrial and Engineering Chemistry for 1924 (vol. 16, p. 362—see also Krall ibid, vol. 16, p. 922), after heating for 240 and 300 minutes at 200° F.

The present invention is not limited to the specific examples hereinbefore set forth wherein the preferred accelerators are employed. Other ratios of the compounding ingredients than those mentioned in the examples, as well as other well known fillers, pigments and the like, may be employed in the production of various types of rubber compounds and are apparent to those skilled in the art to which the invention pertains. The present invention is limited solely by the following claims.

What is claimed is:

1. The new chemical compound, tri(4 phenyl benzo-thiazyl thio methylene) amine.

2. The method of making tri(4-phenyl benzothiazyl thio methylene) amine which comprises reacting substantially three molecular proportions of 2-mercapto 4 phenyl benzothiazole and substantially one molecular proportion of hexamethylenetetramine in the presence of an inert organic solvent.

3. The method of making tri(4-phenyl benzothiazyl thio methylene) amine which comprises dissolving substantially three molecular proportions of 2-mercapto 4-phenyl benzothiazole and substantially one molecular proportion of hexamethylenetetramine in dry dioxan or benzene, heating at refluxing temperature to effect a reaction characterized by the evolution of ammonia and separating insoluble impurities from the product obtained.

DAVID J. BEAVER.